(12) United States Patent
Roesch et al.

(10) Patent No.: US 12,016,088 B2
(45) Date of Patent: Jun. 18, 2024

(54) ZONE-BASED HEATING ELEMENT

(71) Applicant: Georg Fischer Rohrleitungssysteme AG, Schaffhausen (CH)

(72) Inventors: Juergen Roesch, Lenzkirch (DE); Benedikt Engesser, Hochemmingen (DE)

(73) Assignee: Georg Fischer Rohrleitungssysteme AG (CH)

( * ) Notice: Subject to any disclaimer, the term of this patent is extended or adjusted under 35 U.S.C. 154(b) by 0 days.

(21) Appl. No.: 18/219,176

(22) Filed: Jul. 7, 2023

(65) Prior Publication Data

US 2024/0015855 A1  Jan. 11, 2024

(30) Foreign Application Priority Data

Jul. 8, 2022 (EP) .................................. 22 183 714

(51) Int. Cl.
  *H05B 3/22* (2006.01)
  *B29C 65/00* (2006.01)
  *B29C 65/14* (2006.01)

(52) U.S. Cl.
  CPC .......... *H05B 3/22* (2013.01); *B29C 65/1412* (2013.01); *B29C 66/5221* (2013.01); *H05B 2203/005* (2013.01); *H05B 2203/032* (2013.01)

(58) Field of Classification Search
  CPC ............... H05B 3/22; H05B 2203/005; H05B 2203/032; B29C 65/1414; B29C 65/1432; B29C 65/1464; B29C 65/7841; B29C 66/5221; B29C 66/8167; B29C 66/8414; B29C 66/1142
  See application file for complete search history.

(56) References Cited

U.S. PATENT DOCUMENTS

| | | | |
|---|---|---|---|
| 2007/0262075 A1 | 11/2007 | Lee et al. | |
| 2008/0142500 A1* | 6/2008 | Tomita | H01L 21/67184 219/444.1 |
| 2021/0245419 A1* | 8/2021 | Heinz | B29C 53/083 |

FOREIGN PATENT DOCUMENTS

| | | | | |
|---|---|---|---|---|
| CN | 107042638 A | * | 8/2017 | ......... B29C 65/1412 |
| CN | 114589928 A | * | 6/2022 | |
| DE | 4416518 A1 | | 11/1995 | |
| JP | S4715669 U | | 10/1972 | |
| JP | S53121879 A | | 10/1978 | |
| JP | 2010247409 A | | 11/2010 | |
| KR | 101428630 B1 | | 8/2014 | |
| WO | WO-9530534 A1 | * | 11/1995 | ......... B29C 65/1412 |

* cited by examiner

*Primary Examiner* — Shawntina T Fuqua
(74) *Attorney, Agent, or Firm* — Harness, Dickey & Pierce, P.L.C.

(57) ABSTRACT

Heating element for generating IR heat beams for contactlessly heating plastic profile ends, preferably for end-face welding of pipes or fittings clamped in a device, comprising a heating plate made at least partially of a conductive material and having two heatable faces, a heating wire for generating the heat beams, wherein the heating wire is arranged on the faces of the heating plate, wherein the heating plate has a plurality of heating zones spaced apart radially from one another.

20 Claims, 4 Drawing Sheets

ZONE-BASED HEATING ELEMENT

CROSS-REFERENCE TO RELATED APPLICATION

Figure 1:
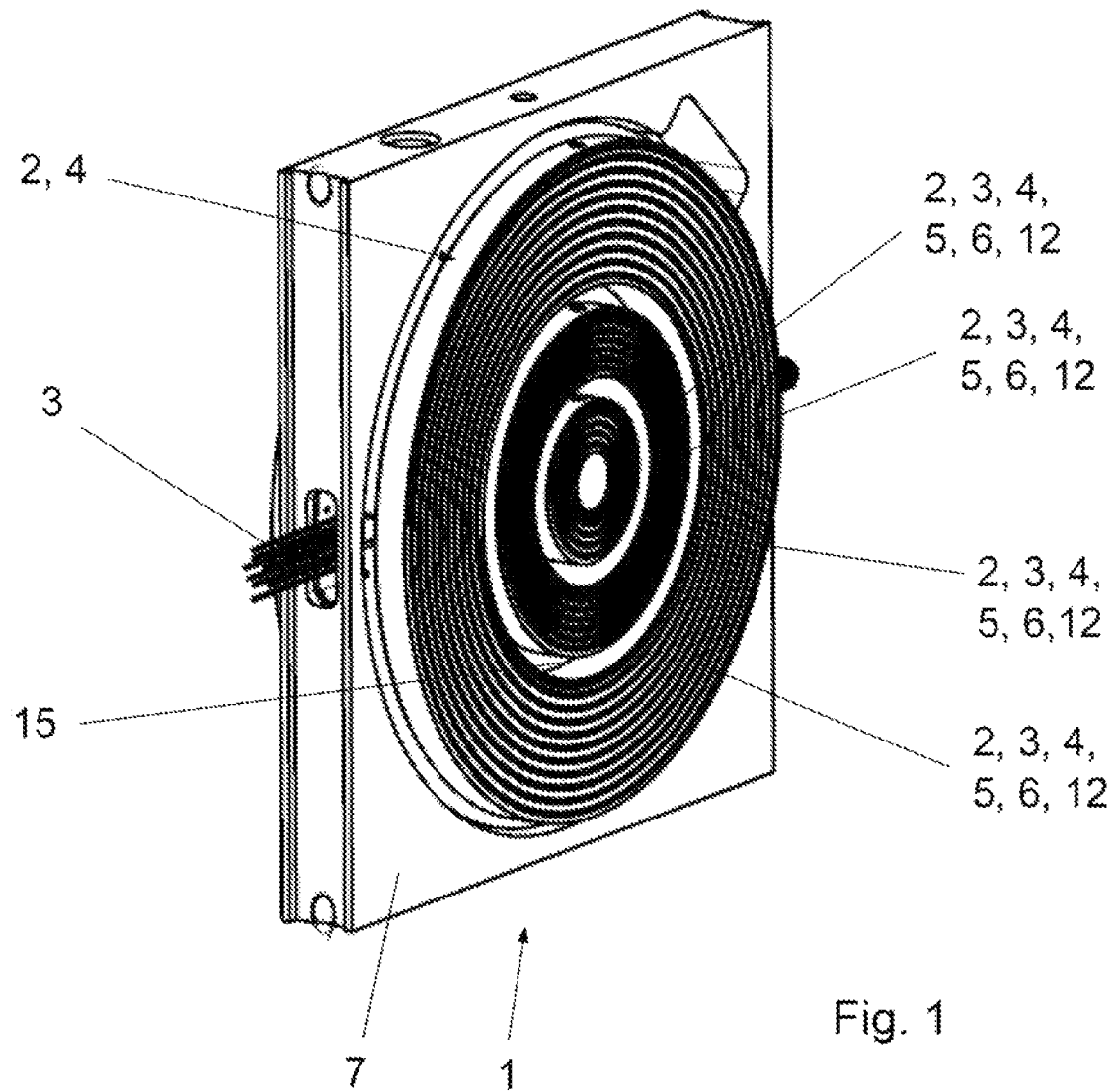

This application claims the benefit and priority of European Patent Application No. 22 183 714.9 filed Jul. 8, 2022. The entire disclosure of the above application is incorporated herein by reference.

BACKGROUND OF THE INVENTION

Technical Field

The invention relates to a heating element for generating IR heat beams for contactlessly heating plastic profile ends, preferably for end-face welding of pipes or fittings clamped in a device, comprising a heating plate made at least partially of a conductive material and having two heatable faces, a heating wire for generating the heat beams, wherein the heating wire is arranged on the faces of the heating plate.

Discussion

Heating elements for welding plastic profiles, wherein the heating of the plastic profile ends takes place contactlessly, are known from the prior art and are often used in chemical as well as in high-purity sectors since there is a high requirement for the cleanliness of the connection between the pipes. Such heating elements usually have heating cartridges which are arranged in bores that project over the circumference into the centre of the heating plate. The entire heating plate is then heated via these heating cartridges. On the one hand, this has the disadvantage that the heating plate does not have a uniform temperature but is warmer in the region of the heating cartridges and has lower temperatures in the regions further away. On the other hand, it is not possible to control the temperature individually in specific regions. In addition, it has been found that, during the heating of a pipe end, heat accumulation occurs in the upper inner region of the pipe, which leads to non-uniform heating and, as a result, a constant, uniform weld seam is not achieved. This heat accumulation is also produced, above all, by the fact that in the inner region of the pipe, where no heating of the heating plate would be necessary, there is strong heating due to the arrangement of the heating cartridges.

US 2007/0262075 A1 discloses a heating plate for double-walled pipes in which the respective end of a pipe is arranged in a groove, wherein the heating wire runs in the heating plate directly under the groove or in the heating plate along the contour of the pipe or of the groove, thereby ensuring that the heat source is also arranged right at the pipe wall thickness. The disadvantage here is that, for different pipe diameters, it is also always necessary to use different heating plates.

SUMMARY OF THE INVENTION

The problem addressed by the invention is that of proposing a heating element for generating IR heat beams for contactless heating which is suitable for different pipe diameters and enables uniform heating, as well as being energy-saving.

This problem is solved according to the invention by the fact that the heating plate has a plurality of heating zones spaced apart radially from one another.

The heating element according to the invention for generating IR heat beams serves for the contactless heating of plastic profile ends, preferably pipe ends or fitting ends, which are clamped in a device for end-face welding. The heating element is preferably arranged in a device for end-face welding or can be retrofitted into such a device and can also replace a conventional welding plate. The heating element according to the invention comprises a heating plate made at least partially of a conductive material and having two opposite, heatable faces facing away from one another. The two heatable faces serve for the simultaneous heating of the opposite pipe ends, which are joined together after heating by the heating element. The heating element comprises a heating wire for generating the IR heat beams, wherein the heating wire is arranged on the faces of the heating plate. In order to achieve optimum heat distribution, the heating plate has a plurality of heating zones spaced apart radially from one another. The heating zones can be heated selectively or optionally independently of one another. This means that, for example, the innermost heating zone is heated and the outer heating zone is not, since a small pipe diameter is being welded.

There is preferably no heat conduction between the heating zones.

Each heating zone is preferably insulated from the heating zone arranged closest to it. This reduces unwanted heat discharge to the adjacent heating zones, which are then usually not heated since only the heating zone corresponding to the pipe diameter is heated.

It is advantageous if the heating element has at least two heating zones. Owing to the range of pipe diameters, it has been found that three to six heating zones are to be preferred on one heating element.

It has been found to be an advantageous embodiment if the heating plate is formed from a plurality of heating rings spaced apart radially from one another. As a result, the heating plate is of modular construction and thus the individual heating rings can be controlled individually.

It has been found to be an advantageous embodiment if an insulation gap is arranged between the heating rings, which insulation gap reduces the heat transfer between the individual heating rings. Owing to the fact that there is a gap between the heating rings in each case and the heating rings do not rest against one another or come into contact with one another anywhere, the heat of the individual heating rings is not transferred by heat conduction to the nearest heating ring; instead, the gap is located between them and the heat is transferred exclusively by convection, which thus represents very low heat transfer.

The heating wire on the faces of the heating rings is preferably arranged in a spiral around the centre of the heating plate. The structure of the heating plate is preferably correspondingly concentric or the heating rings are arranged concentrically with respect to one another and form the heating plate. It has been found to be an advantageous embodiment if the spirally extending heating wire on the respective heating ring forms the heating zone.

It is advantageous if a spacer element is arranged between the heating rings for radial spacing of the heating rings. It is thereby possible to generate a spacing between the heating rings, thus ensuring that the individual heating rings, which are made of a conductive material, preferably aluminium, do not transfer the heat by heat conduction.

It has been found to be a preferred embodiment if the spacer element consists of an insulating material, for example a ceramic material. As a result, the individual heating rings are arranged in a manner insulated from one another.

The spacer element is preferably designed as a half-shell. This permits simple assembly of the heating plate. The heating rings are preferably of one-piece design and are produced as thin-walled as possible to ensure that the energy for heating the pipe is not absorbed by the material of the heating ring but flows into the pipe to be heated. Therefore, the heating rings have a U-shaped cross section or have an all-round recess in the centre of the cross section, in which the spacer element is arranged. To enable it to be inserted there, the spacer element is designed as a half-shell.

It is advantageous if the heating plate is surrounded by a frame. The frame serves as a receptacle or holder for the heating plate.

Owing to the construction of the heating plate, the heating rings and the spacer elements are preferably arranged concentrically with respect to one another. Moreover, it is also advantageous if the axial centre of the spacer elements and heating rings lies in one plane.

Since the heating wire is arranged on the face of the heating plate and preferably runs in a groove, it is advantageous if a cover is arranged on the faces in order to cover the heating wire, and thus the heating wire is protected.

Moreover, it is advantageous if each heating ring or the faces of the heating rings have a separate cover since heat transfer between the individual heating rings due to heat conduction can thereby be avoided because no contact surface is formed between the covers of the heating rings there either.

It has been found to be preferred if the heating rings and the spacer elements are fixed by being clamped together in a frame. This allows precise adjustment and centring of the individual components with respect to one another.

For fixing and centring the heating plate, centring elements which press on the outer circumference of the heating plate are preferably arranged in the frame.

All possible configurations can be freely combined with one another.

DRAWINGS

Figure 2:
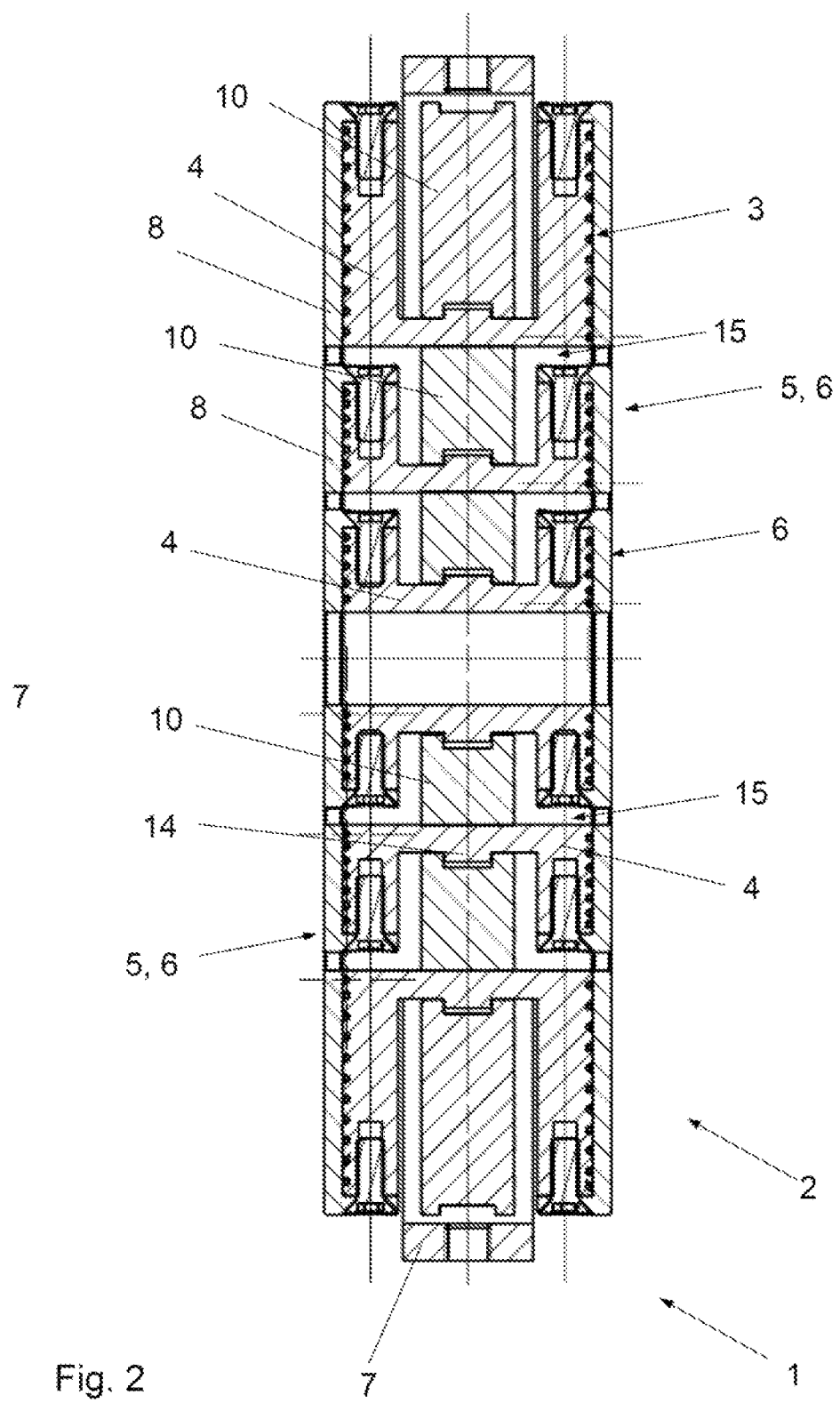
Figure 3:
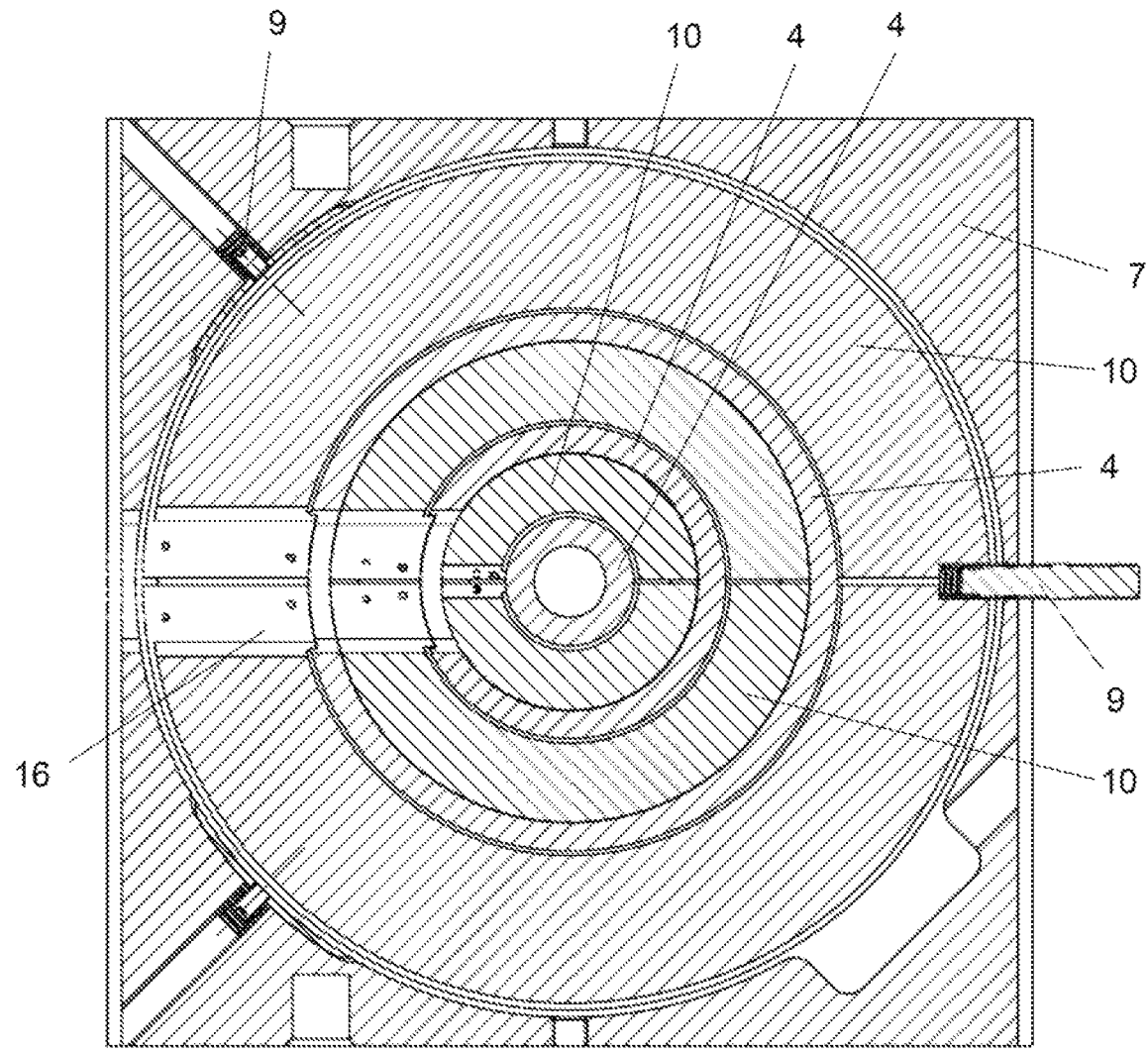
Figure 4:
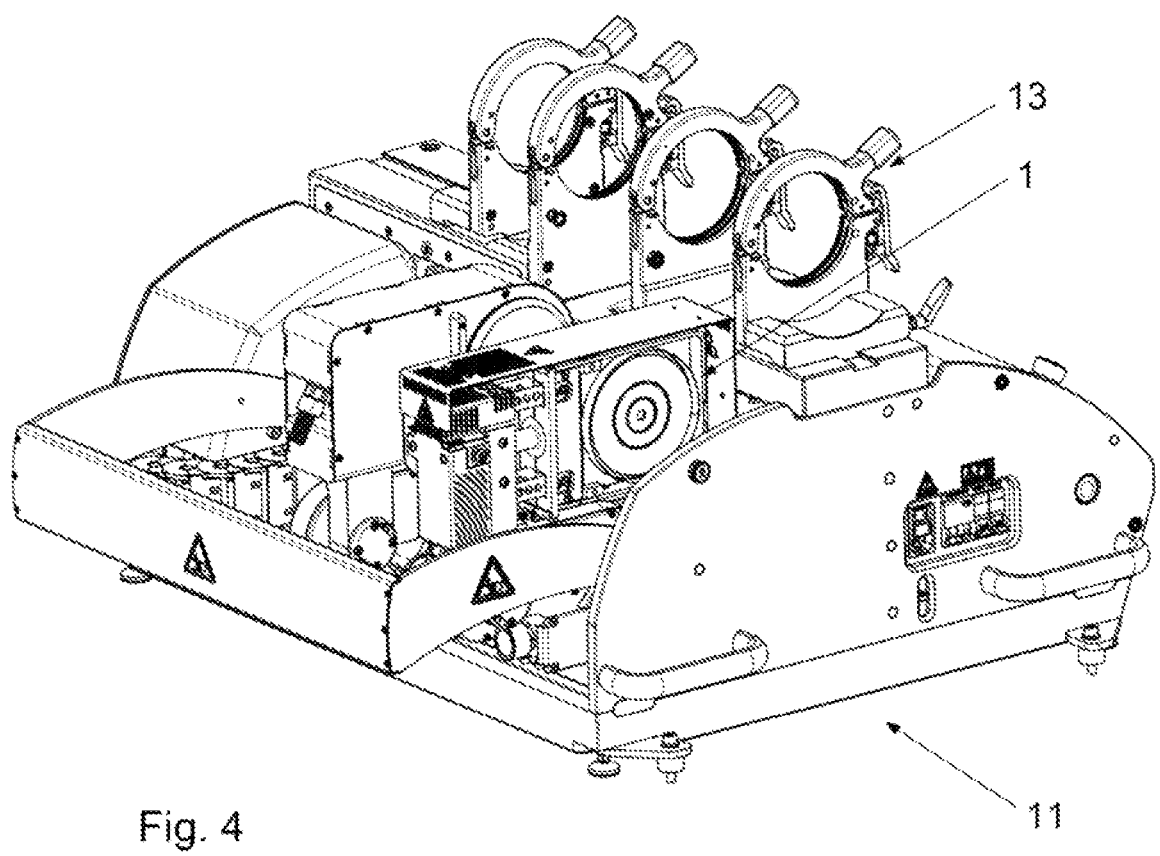

An exemplary embodiment of the invention is described with reference to the figures, although the invention is not limited to the exemplary embodiment. More specifically:

FIG. 1 shows a three-dimensional view of a heating element according to the invention, without covers, FIG. 2 shows a sectional view through a heating element according to the invention with the face covers, FIG. 3 shows a longitudinal section through a heating element according to the invention, and FIG. 4 shows a device for heating plastic pipe ends with a built-in heating element according to the invention.

DESCRIPTION OF THE PREFERRED
EMBODIMENTS OF THE INVENTION

The drawing in FIG. 1 shows a three-dimensional view of a heating element 1 according to the invention. The heating element 1 is designed as an infrared heating element 1 and serves for the contactless welding of plastic profiles, preferably pipe ends as well as fitting ends. The heating element 1 is preferably arranged in a device 11 for welding pipe ends, in which the ends to be welded are clamped opposite one another in a clamping device 13. The heating element 1 can be slid or pivoted between the pipe ends, this arrangement in the device 11 being shown in FIG. 4. The heating element 1 according to the invention comprises a heating plate 2, wherein the heating plate 2 has two heatable, opposite faces 5 facing away from one another. Arranged on the faces 5 of the heating plate 2 is a heating wire 3, which preferably runs spirally around the centre of the heating plate 2. The heating plate 2 according to the invention has a plurality of heating zones 12, which are spaced apart radially from one another, this being recognizable from the all-round insulation gap 15 between the individual heating zones 12. The heating plate 2 of the heating element 1, the said heating plate being illustrated in FIG. 1, has three heating zones 12, wherein the heating plate 2 preferably has at least two heating zones, particularly preferably between two and six heating zones 12. The spacing of the individual heating zones 12 with respect to one another by means of the insulation gap 15 is implemented in order to ensure that the heat is not dissipated to the other heating zones 12. If, for example, welding is carried out on a pipe end having a diameter which is welded by means of the central heating zone 12, the two adjacent heating zones 12 are not activated. It is thereby possible, on the one hand, to save energy and to avoid heat accumulation in the interior of the pipe since only the heating zone 12 which is assigned to the pipe diameter is heated.

FIG. 2 shows the structure of a heating plate 2 according to the invention. The heating plate 2 preferably has heating rings 4, these being spaced apart radially from one another. The heating wire 3 is arranged on the faces 6 of the individual heating rings 4 and preferably extends in a spiral, preferably in a groove provided for this purpose. The cross section of a heating ring 4 is preferably designed as a U shape, thereby reducing the wall thickness, and, as a result, the heat is absorbed only slightly by the conductive material of the heating ring 4 and, as a result, as much of the heat as possible is transferred to the pipe ends to be welded. A spacer element 9 is arranged in the centre of the U-shaped cross section of the heating ring 4. The heating rings 4 are connected to one another via the spacer element 10. The spacer element 10 is made of an insulated material, thereby avoiding or reducing heat transfer between the individual heating rings 4. In order to fasten the spacer elements 10 as simply as possible between the heating rings 4, the spacer elements 10 are designed as half-shells, this being clearly visible in FIG. 3. Thus, the half-shell-shaped spacer rings 10 can be easily adapted around the smaller outside diameter of the heating ring 4. A further heating ring 4 is then arranged on the outside diameter of the spacer element 10, and a spacer element is then again arranged on its smaller outside diameter. The heating plate 2 is formed from so many heating rings and spacer elements that as many diameter sizes as possible of the pipes to be welded can be covered. Of course, some other heating plate construction is also conceivable in order to implement the heating zones 12 spaced apart radially from one another.

It has also been found to be advantageous if the heating rings 4 and spacer elements 10 are axially centred 14 with respect to one another. This is achieved in FIG. 2 by means of a shoulder on the heating ring 4 and a recess in the spacer element 10, but there are also many other solutions here, such as with spacer bushings or other stops, in order to achieve this. To ensure that the width of the heating plate 2 is as far as possible the same everywhere and that no offset occurs between the heating rings 4 and that flat faces 5 of the heating plate 2 are obtained, the axial centre of the heating rings and spacer elements 10 is located in the same plane in all cases.

FIG. 2 shows the covers 8 of the faces 6 of the heating rings 4. These serve to protect the heating wire 3 and prevent unwanted protrusion of the heating wire 3. It is advantageous if each heating ring 4 has a separate cover 8 in order to reduce the heat transfer to the other heating rings 4 as much as possible there as well. Accordingly, there is an insulation gap 15 between the individual heating rings 4, thereby ensuring that no heating ring 4 makes direct contact with another heating ring 4.

It has been found to be a preferred embodiment if the heating plate 2 is arranged in a frame 7, this being clearly apparent in FIG. 3. The concentric arrangement of the heating rings 4 and the spacer elements 10 makes it possible for the components to be braced relative to one another in the frame 7. The heating rings 4 preferably have an aperture for the wire leadthrough 16. By means of centring elements 9, the heating plate 2 is centred in the frame 7 and the heating rings 4 and spacer elements 10 are simultaneously clamped together. It is advantageous if the centring elements 9 are arranged and connected to the frame 7 at three points on the outside diameter of the heating plate. The centring elements 9 are preferably designed as pins which also have a spring element that ensures the central arrangement of the heating plate 2 in the frame 7.

What is claimed is:

1. A heating element (1) for generating IR heat beams for contactlessly heating plastic profile ends, preferably for end-face welding of pipes or fittings clamped in a device, comprising a heating plate (2) made at least partially of a conductive material and having two heatable faces (5), a heating wire (3) for generating the heat beams, wherein the heating wire (3) is arranged on the faces (5) of the heating plate (2), wherein the heating plate (2) has a plurality of heating zones (12) spaced apart radially from one another.

2. A heating element (1) according to claim 1, wherein the heating zones (12) can be heated selectively.

3. A heating element (1) according to claim 1, wherein each heating zone (12) is insulated from the heating zone (12) arranged closest to it.

4. A heating element (1) according to claim 1, wherein the heating element (1) has at least two heating zones (12).

5. A heating element (1) according to claim 1, wherein the heating plate (2) is formed by a plurality of heating rings (4) spaced apart radially from one another.

6. A heating element (1) according to claim 5, wherein an insulation gap (15) is arranged between the heating rings (4), which insulation gap reduces the heat transfer between the individual heating rings (4).

7. A heating element (1) according to claim 6, wherein the heating wire (3) on the faces (6) of the heating rings (4) is arranged in a spiral around the centre of the heating plate (2).

8. A heating element (1) according to claim 6, wherein a spacer element (10) is arranged between the heating rings (4) for radial spacing.

9. A heating element (1) according to claim 8, wherein the spacer element (10) consists of an insulating material.

10. A heating element (1) according to claim 8, wherein the spacer element (10) is designed as a half-shell.

11. A heating element (1) according to claim 1, wherein the heating plate (2) is surrounded by a frame (7).

12. A heating element (1) according to claim 8, wherein heating rings (4) and the spacer elements (10) are arranged concentrically with respect to one another.

13. A heating element (1) according to claim 6, wherein covers (8) are arranged on the faces (6) of the heating rings.

14. A heating element (1) according to claim 8, wherein the heating rings (4) and the spacer elements (10) are fixed by being clamped together in a frame (7).

15. A heating element (1) according to claim 1, wherein the heating plate (2) is fixed and centred in a frame (7) by means of centring elements (9).

16. A heating element for generating infrared (IR) heat beams for welding end faces of pipes clamped in a device, said heating element comprising:
a first inner heating ring;
a series of heating rings progressively radially surrounding the first heating ring;
each of the heating rings being U-shaped having opposing upright conductive outer faces separated by a transverse middle section, the transverse middle section having a shoulder;
each of the rings being separated by an insulating spacer member having a recess receiving the shoulder of the transverse middle section of a heating ring; and
a heating wire on the faces of the rings for generating the infrared (IR) heat beams, the heating wire being configured to generate a plurality of individually controllable heating zones for each of the rings.

17. The heating element of claim 16 where in the spacer member is a half shell.

18. The heating element (1) according to claim 17, wherein heating rings and the spacer members are arranged concentrically with respect to one another.

19. The heating element according to claim 18, wherein the heating rings and the spacer members are fixed by being clamped together in a frame.

20. The heating element according to claim 19, wherein the heating rings fixed and centred in a frame by centring elements.

* * * * *